United States Patent
Kim et al.

(10) Patent No.: US 9,799,331 B2
(45) Date of Patent: Oct. 24, 2017

(54) FEATURE COMPENSATION APPARATUS AND METHOD FOR SPEECH RECOGNITION IN NOISY ENVIRONMENT

(71) Applicant: Electronics and Telecommunications Research Institute, Daejeon (KR)

(72) Inventors: Hyun Woo Kim, Daejeon-si (KR); Ho Young Jung, Daejeon-si (KR); Jeon Gue Park, Daejeon-si (KR); Yun Keun Lee, Daejeon-si (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 15/074,579

(22) Filed: Mar. 18, 2016

(65) Prior Publication Data

US 2016/0275964 A1 Sep. 22, 2016

(30) Foreign Application Priority Data

Mar. 20, 2015 (KR) .......................... 10-2015-0039098

(51) Int. Cl.
*G10L 15/20* (2006.01)
*G10L 15/02* (2006.01)

(52) U.S. Cl.
CPC .............. *G10L 15/20* (2013.01); *G10L 15/02* (2013.01)

(58) Field of Classification Search
CPC .......... G10L 15/20; G10L 17/20; G10L 21/02
See application file for complete search history.

(56) References Cited

U.S. PATENT DOCUMENTS 7,310,599 B2 * 12/2007 Frey ........................ G10L 15/02
                                                  704/231
8,131,543 B1 * 3/2012 Weiss ...................... G10L 25/78
                                                  704/210

(Continued)

FOREIGN PATENT DOCUMENTS

KR     10-1999-0015044 A     9/2005

OTHER PUBLICATIONS

Watanabe, Shinji, and Atsushi Nakamura. "Predictor-corrector adaptation by using time evolution system with macroscopic time scale." IEEE transactions on audio, speech, and language processing 18.2 (2010): 395-406.*

(Continued)

*Primary Examiner* — Brian Albertalli
(74) *Attorney, Agent, or Firm* — Nelson Mullins Riley & Scarborough LLP; Anthony A. Laurentano

(57) ABSTRACT

A feature compensation apparatus includes a feature extractor configured to extract corrupt speech features from a corrupt speech signal with additive noise that consists of two or more frames; a noise estimator configured to estimate noise features based on the extracted corrupt speech features and compensated speech features; a probability calculator configured to calculate a correlation between adjacent frames of the corrupt speech signal; and a speech feature compensator configured to generate compensated speech features by eliminating noise features of the extracted corrupt speech features while taking into consideration the correlation between adjacent frames of the corrupt speech signal and the estimated noise features, and to transmit the generated compensated speech features to the noise estimator.

14 Claims, 8 Drawing Sheets

(56) References Cited

U.S. PATENT DOCUMENTS

| | | | | |
|---|---|---|---|---|
| 8,639,502 | B1* | 1/2014 | Boucheron | G10L 21/02 381/94.1 |
| 2004/0181409 | A1* | 9/2004 | Gong | G10L 15/142 704/256 |
| 2005/0119883 | A1 | 6/2005 | Miyazaki et al. | |
| 2006/0053008 | A1* | 3/2006 | Droppo | G10L 15/20 704/234 |
| 2008/0140399 | A1 | 6/2008 | Chung | |
| 2009/0076813 | A1* | 3/2009 | Jung | G10L 15/20 704/233 |
| 2009/0265168 | A1 | 10/2009 | Kang et al. | |
| 2010/0262423 | A1 | 10/2010 | Huo et al. | |
| 2012/0095762 | A1* | 4/2012 | Eom | G10L 15/02 704/237 |
| 2014/0114650 | A1* | 4/2014 | Hershey | G10L 21/0232 704/203 |
| 2015/0287406 | A1* | 10/2015 | Kristjansson | G10L 21/0232 704/233 |

OTHER PUBLICATIONS

Deng, Jianping, Martin Bouchard, and Tet Hin Yeap. "Feature enhancement for noisy speech recognition with a time-variant linear predictive HMM structure." IEEE Transactions on Audio, Speech, and Language Processing 16.5 (2008): 891-899.*

Kundu, Achintya, et al. "GMM based Bayesian approach to speech enhancement in signal/transform domain." Acoustics, Speech and Signal Processing, 2008. ICASSP 2008. IEEE International Conference on. IEEE, 2008.*

Windmann, Stefan, and Reinhold Haeb-Umbach. "Modeling the dynamics of speech and noise for speech feature enhancement in ASR." Acoustics, Speech and Signal Processing, 2008. ICASSP 2008. IEEE International Conference on. IEEE, 2008.*

Kim, Nam Soo, Woohyung Lim, and Richard M. Stern. "Feature compensation based on switching linear dynamic model." IEEE Signal Processing Letters 12.6 (2005): 473-476.*

Droppo, Jasha, and Alex Acero. "Noise robust speech recognition with a switching linear dynamic model." Acoustics, Speech, and Signal Processing, 2004. Proceedings.(ICASSP'04). IEEE International Conference on. vol. 1. IEEE, 2004.*

Deng, Jianping, Martin Bouchard, and Tet Hin Yeap. "Noisy Speech Feature Estimation on the Aurora2 Database using a Switching Linear Dynamic Model." Journal of Multimedia 2.2 (2007): 47-52.*

Kim, Nam Soo. "Feature domain compensation of nonstationary noise for robust speech recognition." Speech Communication 37.3 (2002): 231-248.*

Du, J. et al., "An Improved VTS Feature Compensation using Mixture Models of Distortion and IVN Training for Noisy Speech Recognition," IEEE/ACM Transactions on Audio, Speech, and Language Processing, vol. 22(11), pp. 1601-1611 (2014).

* cited by examiner

FEATURE COMPENSATION APPARATUS AND METHOD FOR SPEECH RECOGNITION IN NOISY ENVIRONMENT

CROSS-REFERENCE TO RELATED APPLICATION(S)

This application claims priority from Korean Patent Application No. 10-2015-0039098, filed on Mar. 20, 2015, in the Korean Intellectual Property Office, the disclosure of which is incorporated herein by reference in its entirety.

BACKGROUND

1. Field

The following description relates to speech recognition, and more specifically, to a technology for improving speech recognition performance in noisy environments.

2. Description of Related Art

Speech recognition techniques using statistical patterns are in wide use in the field of speech recognition. However, performance of said techniques lessen due to multiple factors, a main factor being that in speech recognition performance based on statistical patterns, there is a difference in acoustic features between a speech signal used in acoustic model training and an actual speech signal that is input in the real environment. For example, during speech recognition, various background noises (i.e., car noises, music, etc.) of the real environment may be registered with the input speech signal, whereby the input speech signal has different acoustic features from the speech signal used in model training. To reduce such discrepancies in acoustic features, speech enhancement, feature compensation, and model adaptation are used.

Speech recognition based on the feature compensation, which is classified into data-driven compensation and model-based compensation, may be inferior to speech recognition based on the model adaption; however, with only a small amount of computation, the feature compensation can be flexibly applied to new speech recognition environments.

Typical model-based speech feature compensation represents a distribution of speech features as a Gaussian mixture model (GMM). This method, however, cannot utilize temporal dynamics of adjacent speech frames, which is one of the most critical features that distinguish a speech signal from a noise signal. This may degrade speech recognition performance in an environment where there is background noise, such as babble noise or TV noise. The extended Kalman filter, used in noise feature estimation, exhibits superior performance in estimation of non-stationary noise features that gradually change over time. However, said filter uses features of a current frame, and hence an uncorrelated assumption may prove inaccurate, or observation model errors may occur. Accordingly, noise feature estimation would be inaccurate, and particularly, this incorrect noise feature estimation in a speech interval may lead a poor performance of speech recognition.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

The following description relates to a feature compensation apparatus and method for speech recognition in a noisy environment, which utilize temporal dynamics of adjacent speech frames in the course of linear model-based speech feature compensation, thereby improving speech recognition performance.

In one general aspect, there is provided a feature compensation apparatus for speech recognition in a noisy environment, the feature compensation apparatus including: a feature extractor configured to extract corrupt speech features from a corrupt speech signal with additive noise that consists of two or more frames; a noise estimator configured to estimate noise features based on the extracted corrupt speech features and compensated speech features; a probability calculator configured to calculate a correlation between adjacent frames of the corrupt speech signal; and a speech feature compensator configured to generate compensated speech features by eliminating noise features of the extracted corrupt speech features while taking into consideration the correlation between adjacent frames of the corrupt speech signal and the estimated noise features, and to transmit the generated compensated speech features to the noise estimator. In addition, the feature compensation apparatus may further include a linear model generator configured to approximate a GMM probability distribution, the estimated noise features and the corrupt speech features into a linear model.

The feature extractor may convert each frame of the corrupt speech signal from time domain to frequency domain, and calculate a log energy value by taking a logarithm of energy which has been calculated by applying a Mel-scale filter bank to the converted corrupt speech signal, thereby extracting the corrupt speech features. The feature extractor may smooth the corrupt speech signal before taking a logarithm of the energy which has been calculated by applying the Mel-scale filter bank to the converted corrupt speech signal. In addition, the noise estimator may estimate an average and variance of noise features based on a dynamics model of noise features of the extracted corrupt speech features and a nonlinear observation model of corrupt speech features.

The probability calculator may include: a probability distribution obtainer configured to obtain a Gaussian mixture model (GMM) probability distribution of speech features from training speech signals that consist of two or more frames; a transition probability codebook obtainer configured to obtain a transition probability of a GMM mixture component between adjacent frames of the training speech features; and a transition probability calculator configured to search transition probabilities of a GMM mixture component between adjacent frames of each training speech signal to calculate a transition probability of the GMM mixture component that corresponds to a transition probability of a mixture component between adjacent frames of the corrupt speech features extracted from the corrupt speech signal. The speech feature compensator may eliminate the noise features of the extracted corrupt speech features using the correlation between adjacent frames of the corrupt speech signal and the estimated noise features, wherein the correlation is based on the GMM probability distribution of the training speech signals and the transition probability of a GMM mixture component.

The probability calculator may obtain a statistic model with a hidden Markov model (HMM) structure of training speech features from training speech signals that consist of two or more frames, decode the training speech features into a HMM, and calculate HMM state probabilities. The speech feature compensator may eliminate the estimated noise features of the corrupt speech features using a statistical model of the training speech features, the estimated noise features, the extracted corrupt speech features, and the HMM state probabilities.

In another general aspect, there is provided a feature compensation method for speech recognition in a noisy environment, the feature compensation method including: extracting corrupt speech features from a corrupt speech signal with additive noise that consists of two or more frames; estimating noise features based on the extracted corrupt speech features and compensated speech features; calculating a correlation between adjacent frames of the corrupt speech signal; and generating compensated speech features by eliminating noise features of the extracted corrupt speech features while taking into consideration the correlation between adjacent frames of the corrupt speech signal and the estimated noise features, and transmitting the generated compensated speech features.

Other features and aspects will be apparent from the following detailed description, the drawings, and the claims.

Figure 1:
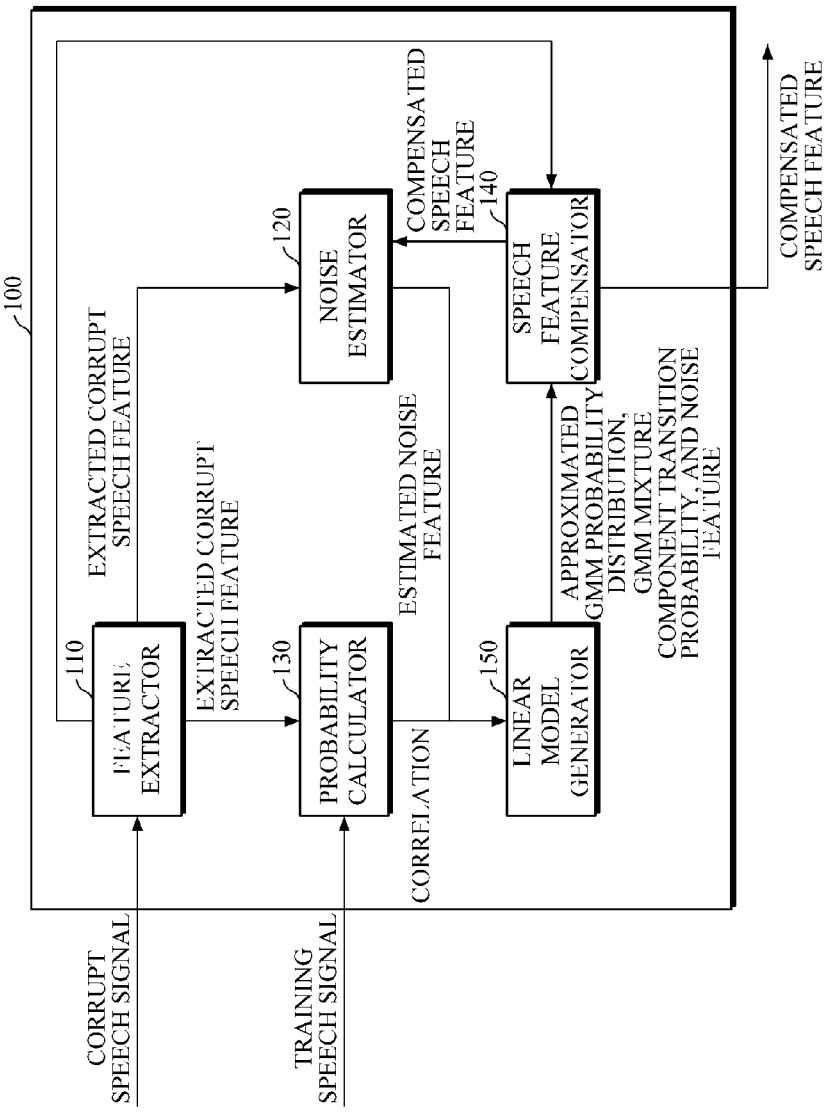
FIG. 1 is a diagram illustrating a feature compensation apparatus for speech recognition in a noisy environment according to an exemplary embodiment.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

FIG. 1 is a diagram illustrating a feature compensation apparatus for speech recognition in a noisy environment according to an exemplary embodiment.

Referring to FIG. 1, a feature compensation apparatus 100 for speech recognition in a noisy environment suppresses noise by taking into consideration other neighboring frames in addition to frames of a speech signal, which is unlike the traditional noise suppression used in a conventional speech recognition method. To this end, the feature compensation apparatus 100 includes a feature extractor 110, a noise estimator 120, a probability calculator 130, a speech feature compensator 140, and a linear model generator 150.

The feature extractor 110 extracts corrupt speech features from a corrupt speech signal. The corrupt speech signal refers to both a target speech signal to be recognized and a speech signal with additive noise. The feature extractor 110 may divide a corrupt speech signal into two or more frames based on a designated time interval. The feature extractor 110 first converts the corrupt speech signal from time domain into frequency domain. The corrupt speech signal consists of time-sequential frames. The feature extractor 110 may convert the corrupt speech signal from time domain into frequency domain by applying fast Fourier transform (FFT) to each frame of said speech signal. Then, the feature extractor 110 obtains the corrupt speech features by calculating a log energy value after applying a Mel-scale filter bank, which is closely related to speech recognition, to the corrupt speech signal in frequency domain. The filter bank is a group of passband filters that separate the frequency band of the speech signal into multiple components, in which outputs from said filters are used in speech analysis.

The noise estimator 120 estimates noise features using both the corrupt speech features extracted by the feature extractor 110 and speech features compensated by the feature compensator 140. The noise estimator 120 may estimate the average and variance of noise features by applying the extended Kalman filter to the extracted corrupt speech features based on a dynamics model and an observation model. This estimation mainly consists of prediction and correction. The noise estimator 120 may reduce a Kalman gain of an average and variance of noise features which are to be updated in inverse proportion to a ratio of the extracted corrupt speech feature to noise feature. The noise feature estimation performed by the noise estimator 120 will be described additionally with reference to FIG. 2.

The probability calculator 130 may obtain a statistic model with a hidden Markov model (HMM) structure of training speech features from training speech signals that consist of two or more frames. Then, the probability calculator 130 may decode the training speech features into a HMM and calculate HMM state probabilities. The probability calculator 130 may first calculate information about a correlation between adjacent frames of a corrupt speech signal using the training speech signals. According to the exemplary embodiment, training speech features are compensated by taking into consideration the correlation between different adjacent frames. The training speech signal is an uncorrupt speech signal without any noise therein and thus is distinguishable from the corrupt speech signal that is a target of speech recognition. The training speech signal relates to preprocess that takes place before the speech recognition process of the corrupt speech signal. In one exemplary embodiment, the probability calculator 130 may calculate the correlation between adjacent frames of a training speech signal using a Gaussian mixture model (GMM) or a hidden Markov model (HMM). In the exemplary embodiment shown in FIG. 1, the correlation is calculated using the GMM. The correlation calculation by the probability calculator 130 will be additionally described with reference to FIGS. 4 and 5.

During the preprocess, the probability calculator 130 obtains a GMM distribution of training speech features from the training speech signal. To this end, the probability calculator 130 includes a probability distribution obtainer, a transition probability codebook obtainer, and a transition probability calculator. The probability distribution obtainer obtains a GMM probability distribution of training speech features from the training speech signals that consist of two or more frames. The transition probability codebook obtainer obtains a transition probability of a GMM component between adjacent frames. The transition probability calculator searches transition probabilities of a GMM mixture component between adjacent frames of each training speech signal to calculate the transition probability of a GMM mixture component that corresponds to a transition probability of a mixture component between adjacent frames of the corrupt speech feature extracted from the corrupt speech signal. Generally, the correlation between a corrupt signal and a speech signal is higher than the correlation between a noise signal and the speech signal. By doing so, the probability calculator 130 can perform speech feature compensation in which noise is suppressed while taking the correlation between adjacent frames into consideration, rather using only one frame out of multiple frames of the corrupt speech signal.

The linear model generator 150 approximates nonlinearity among training speech features, noise features, and corrupt speech features into a linear model, using a GMM probability distribution of training speech features, which is obtained by the probability distribution obtainer of the probability calculator 130, and the noise features estimated by the noise estimator 120. The relationships among training speech features, noise features, corrupt speech features may always appear to be nonlinear. The linear model generator 150 may approximate said information, which is of a nonlinear model, into a linear model using a vector Taylor series or statistical linear approximation.

The speech feature compensator 140 generates compensated speech features by eliminating the noise features of the corrupt speech features extracted by the feature extractor 110 while taking into account the correlation between adjacent frames of the corrupt speech signal, which is obtained by the probability calculator 130, and the noise features estimated by the noise estimator 120. The speech feature compensator 140 eliminates noise through the speech feature compensation as described above, thereby making it possible to improve speech recognition performance.

Figure 2:
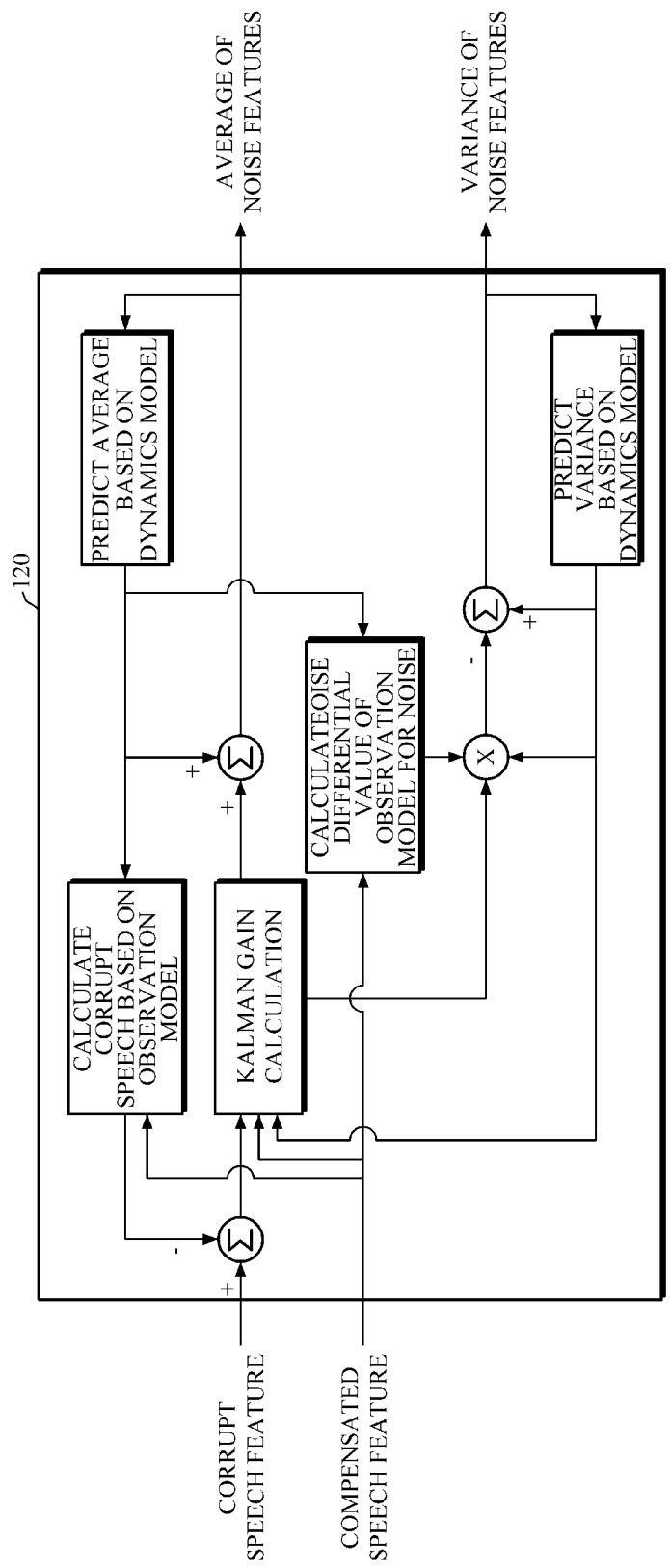
FIG. 2 is a diagram for explaining noise estimation performed by the noise estimator of the feature compensation apparatus of FIG. 1.

FIG. 2 is a diagram for explaining noise estimation performed by the noise estimator of the feature compensation apparatus of FIG. 1.

Referring to FIG. 2, the noise estimator 120 estimates, in real time, noise features of a corrupt speech signal by using an extended Kalman filter. The noise estimator 120 sets a dynamics model and an observation model of k-th features of the t-th frame including a k-th noise feature ($N_k(t)$), a k-th speech feature ($X_k(t)$), and a k-th corrupt speech feature ($Y_k(t)$), as shown in Equation 1 below.

$$N_k(t)=N_k(t-1)+W_k(t)$$

$$Y_k(t)=X_k(t)+\log(1+e^{N_k(t)-X_k(t)}) \qquad (1)$$

In Equation 1, $W_k(t)$ is a normal distribution having an average of 0 and a variance $Q_k$, denoting an amount of noise that changes over time.

The average and variance of noise features are estimated by applying an extended Kalman filter based on the dynamics model and the observation model. The estimation may mainly consist of prediction process and correction process. In the prediction process, an average $N_k^P(t)$ of predicted noise features of a current frame is estimated as being equal to an estimated average ($\hat{N}_k(t-1)$) of noise features of a previous frame. A variation ($\Sigma_k^P(t)$) of noise features of a current frame is estimated as the sum of an estimated variance ($\hat{\Sigma}_{n,k}(t-1)$) of noise features of a previous frame and a variance of an amount $W_k(t)$ of noise. In the correction process, given that differential values of the observation models for estimated noise features and compensated speech feature are ($\hat{X}_k(t)$) denoted as "A" and "B," respectively, the estimated average ($\hat{N}_k(t)$) and variance ($\hat{\Sigma}_{n,k}(t)$) of noise features in the current frame are calculated as Equation 2 below.

$$\hat{N}_k(t)=N_k^P(t)+K_k(t)(Y_k(t)-\hat{X}_k(t)-\log(1+e^{N_k^P(t)-\hat{X}_k(t)}))$$

$$\hat{\Sigma}_{n,k}(t)=(1-K_k(t)A)\Sigma_{n,k}^P(t) \qquad (2)$$

In Equation 2, $K_k(t)$ is Kalman gain that is calculated by using Equation 3 below.

$$K_k(t)=\Sigma_{n,k}^P(t)A(A^2\Sigma_{n,k}^P)(t)+B^2\hat{\Sigma}_{x,k}(t))^{-1} \qquad (3)$$

Figure 3:
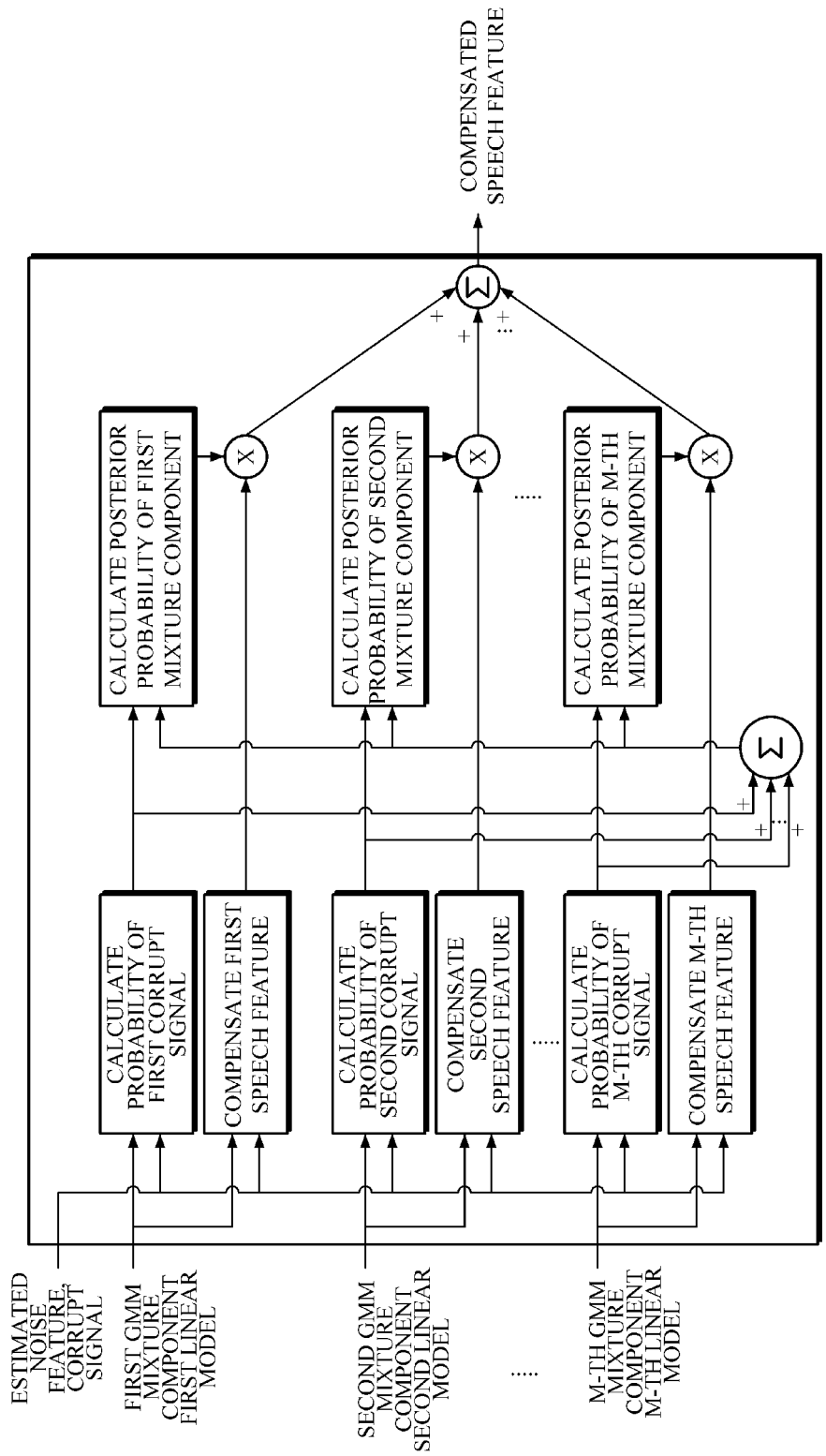
FIG. 3 is a diagram illustrating speech feature compensation using a minimum mean square error (MMSE).

FIG. 3 is a diagram illustrating speech feature compensation using a minimum mean square error (MMSE).

Referring to FIG. 3, a compensated speech feature ($\hat{X}_k(t)$) for speech recognition in a noisy environment according to a traditional method is calculated by using Equation 4 below, for which a compensated speech feature in the j-th mixture component of the t-th frame based on MMSE is obtained by utilizing mixture components of a Gaussian mixture model (GMM), a linear model, estimated noise features, and a corrupt speech signal, and the compensated speech feature is multiplied by a posterior probability.

$$\hat{X}_k(t) = E[X_k(t) | \hat{N}_k(t), \hat{\Sigma}_{n,k}(t), Y_k(t)] = \sum_{j=1}^{M} p(m_t = \\ j | \hat{N}_k(t), \hat{\Sigma}_{n,k}(t), Y_k(t))E[X_k(t) | m_t = j, \hat{N}_k(t), \hat{\Sigma}_{n,k}(t), Y_k(t)] \qquad (4)$$

In Equation 4, a posterior probability of the j-th mixture component ($m_t$=j) of the t-th frame is computed by normalizing the likelihood of a corrupt signal, as shown in Equation 5 below.

$$p(m_t = j | \hat{N}_k(t), \hat{\Sigma}_{n,k}(t), Y_k(t)) = \frac{p(Y(t) | \hat{N}_k(t), \hat{\Sigma}_{n,k}(t), m_t = j)}{\sum_{i=1}^{M} p(Y(t) | \hat{N}_k(t), \hat{\Sigma}_{n,k}(t), m_t = j)} \qquad (5)$$

In Equation 5, M denotes the total number of GMM mixture components.

Figure 4:
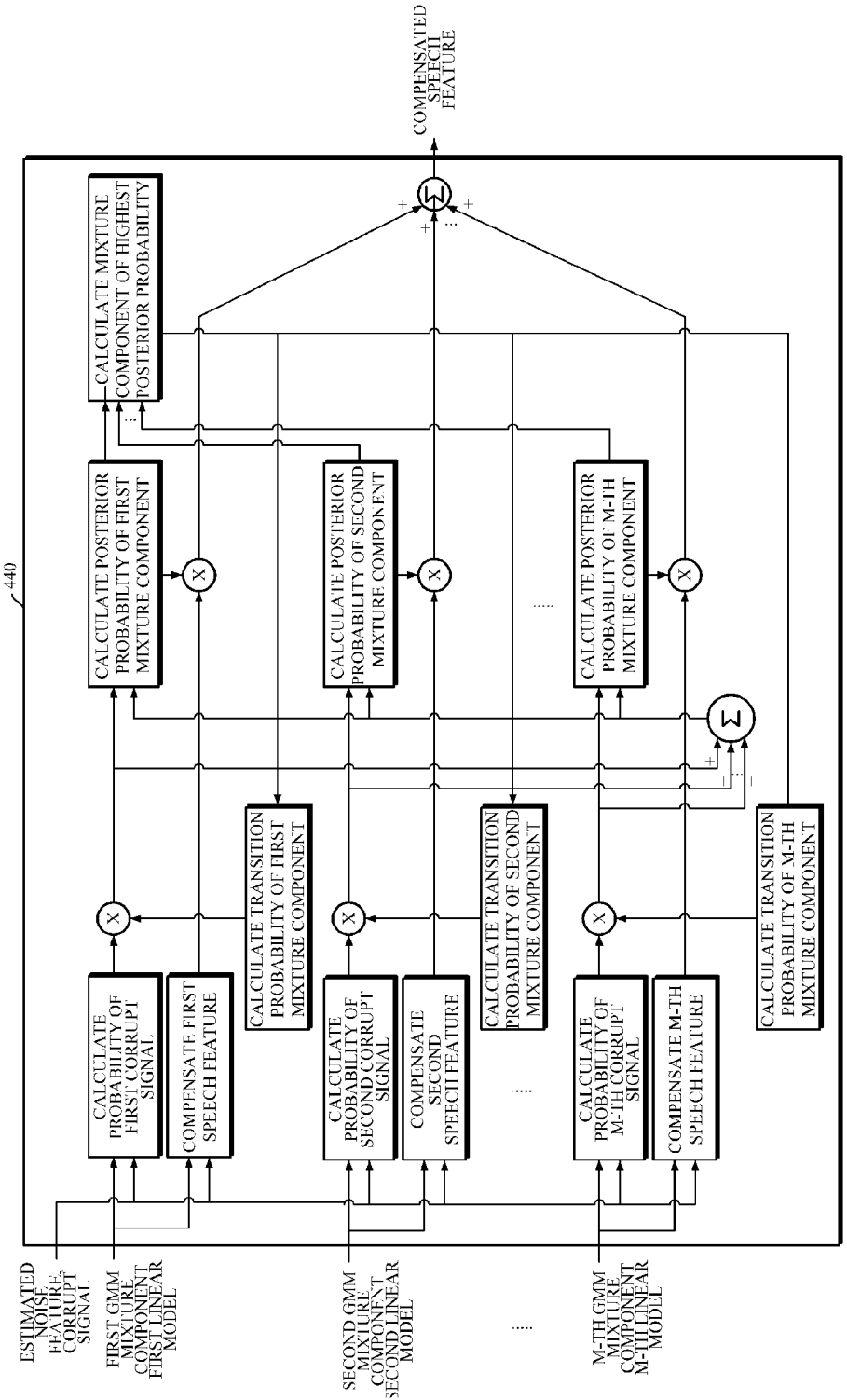
FIG. 4 is a diagram that illustrates the process of speech feature compensation performed by a feature compensation apparatus, which uses a GMM transition probability in its feature compensation process for speech recognition in a noisy environment according to an exemplary embodiment.

FIG. 4 is a diagram that illustrates the performance of a feature compensation apparatus. According to the exemplary embodiment, said apparatus uses a GMM transition probability in its feature compensation process for speech recognition in a noisy environment.

Referring to FIG. 4, a speech feature compensator 440 of the feature compensation apparatus may compensate a speech feature, using transition probability of a Gaussian mixture component between adjacent speech frames. Generally, adjacent frames of speech are highly correlated. However, the traditional speech recognition method performs estimation based on the MMSE of a current frame, as shown in FIG. 3, and hence said method cannot factor in any considerations regarding correlations among frames in its estimations. The present disclosure uses a transition probability of GMM mixture components between adjacent frames so that only a minimum amount of computation is needed to utilize frame information. A transition probability codebook is obtained from training speech signals in advance by the probability calculator 130. The probability calculator 130 assigns a mixture component with the highest posterior probability to all frames of the training speech signal, and then calculates a transition probability codebook for mixture components between previous frames and current frames, as shown in Equation 6 below.

$$p(m_t = j \mid \hat{m}_{t-1}, \ldots, \hat{m}_1) = \frac{\text{count}((\hat{m}_{t-1}, \ldots, \hat{m}_1) \to (m_t = j))}{\sum_{i=1}^{M} \text{count}((\hat{m}_{t-1}, \ldots, \hat{m}_1) \to (m_t = i))}, \quad (6)$$

$$j = 1, \ldots M$$

In Equation 6, count(x) is the number of frames having a mixture component x.

A mixture component having the highest posterior probability among the previous frames is computed and stored, and then a transition probability of mixture components between the adjacent frames is searched from the obtained codebook. The posterior probability of mixture components is calculated using the transition probability, as shown in Equation 7 below.

$$p(m_t = j \mid \hat{N}_k(t), \hat{\Sigma}_{n,k}(t), Y_k(t), \hat{m}_{t-1}, \ldots, \hat{m}_1) = \quad (7)$$

$$\frac{p(Y_k(t) \mid \hat{N}_k(t), \hat{\Sigma}_{n,k}(t), m_t = j) p(m_t = j \mid \hat{m}_{t-1}, \ldots, \hat{m}_1)}{\sum_{i=1}^{M} p(Y_k(t) \mid \hat{N}_k(t), \hat{\Sigma}_{n,k}(t), m_t = i) p(m_t = i \mid \hat{m}_{t-1}, \ldots, \hat{m}_1)}$$

According to the exemplary embodiment, it is possible to calculate an accurate posterior probability and estimate clean speech features. Such calculation and estimation can only be realized under the assumption that mixture components of the current frame are only affected by the mixture components of the previous frames.

Figure 5:
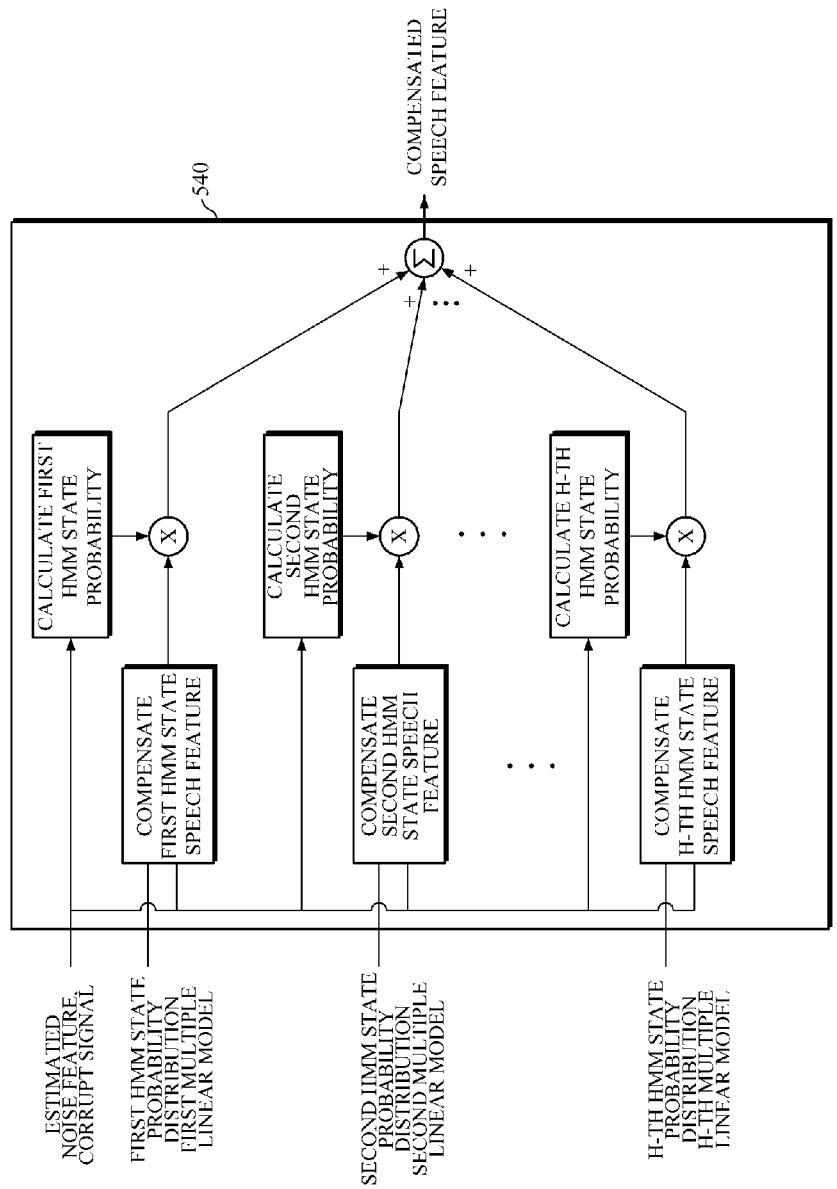
FIG. 5 is a diagram that illustrates the process of speech feature compensation performed by a feature compensation apparatus, which uses a state sequence probability value of a hidden Markov model (HMM) for speech recognition in a noisy environment, according to another exemplary embodiment.

FIG. 5 is a diagram that illustrates the process of speech feature compensation performed by a feature compensation apparatus for speech recognition in a noisy environment. According to another exemplary embodiment, said process uses a state sequence probability value of a hidden Markov model (HMM).

Referring to FIG. 5, the feature compensation apparatus may perform speech feature compensation by using HMM state sequence probability values of adjacent speech frames. A speech feature compensator 540 obtains left-right hidden Markov models in advance from training speech signals, for which each left-right hidden Markov model models temporal transitions of speech feature frames from one state to another state. Then, the speech feature compensator 540 calculates a distribution of probability of training speech features. For example, ten monophone HMMs, as shown in table 1 below, are generated according to places of articulation, and each model may be represented as three states and eight normal distributions.

TABLE 1

| Mono-phone HMM | (i,e,E,we,wE,wi,Wi,je,jE) / (a,ja,wa,v,jv,wv,o,u,U,jo,ju) //(b,xb,B,p,m,xm) / (d,D,xd,n,xn,t,r,xl) / (s,S) /(g,G,xg,k,N) / (z,Z,c) / (h) / (sil) / (sp) |
|---|---|

Adjacent input speech features are decoded into HMMs, and the s-th HMM state probability ($p(q(t)=s|\hat{N}_k(t), \hat{\Sigma}_{n,k}(t), \hat{\lambda}_{HMM}, Y_k(t), \ldots, Y_k(1))$) is calculated. A speech feature ($E[X(t)|\hat{N}_k(t), \hat{\Sigma}_{n,k}(t), q(t)=s, Y(t)]$) in the s-th HMM state is estimated using the traditional speech feature compensation method as described with reference to FIG. 3. Then, the estimated speech feature in the s-th HMM state and the calculated s-th HMM state probability are multiplied together, and all resulting values are summed up, as shown in Equation 8, to obtain a new speech feature.

$$\hat{X}_{s \times t}(t) = \sum_{s=0}^{s-1} p(q(t) = s \mid \hat{N}_k(t), \hat{\Sigma}_{n,k}(t), \hat{\lambda}_{HMM}, \quad (8)$$

$$Y(t), \ldots, Y(1)) E[X(t) \mid \hat{N}_k(t), \hat{\Sigma}_{n,k}(t), q(t) = s, Y(t)]$$

In Equation 8, $\hat{\lambda}_{HMM}$ denotes a hidden Markov model.

Figure 6:
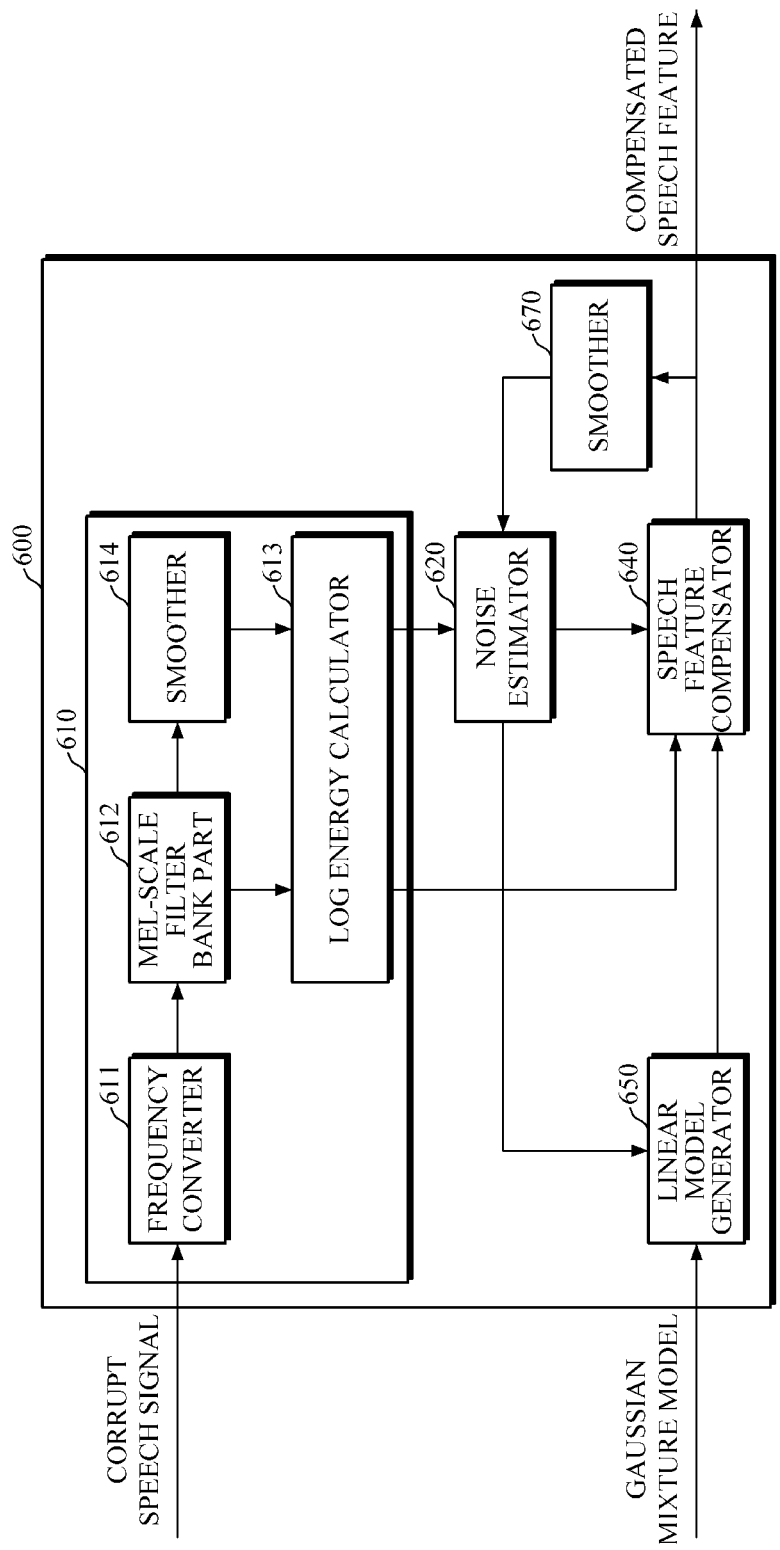
FIG. 6 is a diagram illustrating a configuration of a feature compensation apparatus for speech recognition in a noisy environment according to another exemplary embodiment.

FIG. 6 is a diagram illustrating a configuration of a feature compensation apparatus for speech recognition in a noisy environment according to another exemplary embodiment.

Referring to FIG. 6, a feature compensation apparatus performs real-time speech feature estimation by using the process of smoothing to improve performance of an extended Kalman filter. A nonlinear observation model is based on an assumption that noise and speech are uncorrelated with each other. If an original noise feature and an original speech feature of a current frame are used intact, it is discrepant from the assumption that said features are uncorrelated with each other, and thus errors may occur in nonlinear function of the observation model and which may in turn cause of inaccurate noise estimation. Thus, in the exemplary embodiment, to address the aforesaid problems, energy in each frequency is calculated using a frequency converter 611 and a Mel-scale filter bank part 612 in the course of noise feature estimation using the extended Kalman filter, and then smoothing is performed by a smoother 614 before taking a logarithm. That is, a smoothed speech signal may be obtained, as shown in Equation 9, from the filter bank energy of the corrupt speech signal with additive noise which is output by the Mel-scale filter bank part 612.

$$\tilde{y}_k(t) = \alpha \times \tilde{y}_k(t-1) + (1-\alpha) \times y_k(t) \quad (9)$$

In Equation 9, ($y_k(t)$) denotes a Mel-scale filter bank energy of a speech signal, ($\tilde{y}_k(t)$) denotes a smoothed speech signal, and $\alpha$ is a constant that indicates information about smoothing and has a value between 0 and 1.

Compensated speech features generated by a speech feature compensator 640 are also smoothed by a smoother 670 in the same manner as described above. Smoothing of the compensated speech features is represented as Equation 10 below.

$$\tilde{x}_k(t) = \beta \times \tilde{x}_k(t-1) + (1-\beta) \times e^{\tilde{x}_k(t)}$$

$$\tilde{X}_{smooth,k}(t) = \log(\tilde{x}_k(t)) \quad (10)$$

In Equation 10, $\hat{X}_{smooth,k}(t)$ represents a smoothed compensated speech feature, and β is a constant that indicates a degree of smoothing and has a value between 0 and 1.

Figure 7:
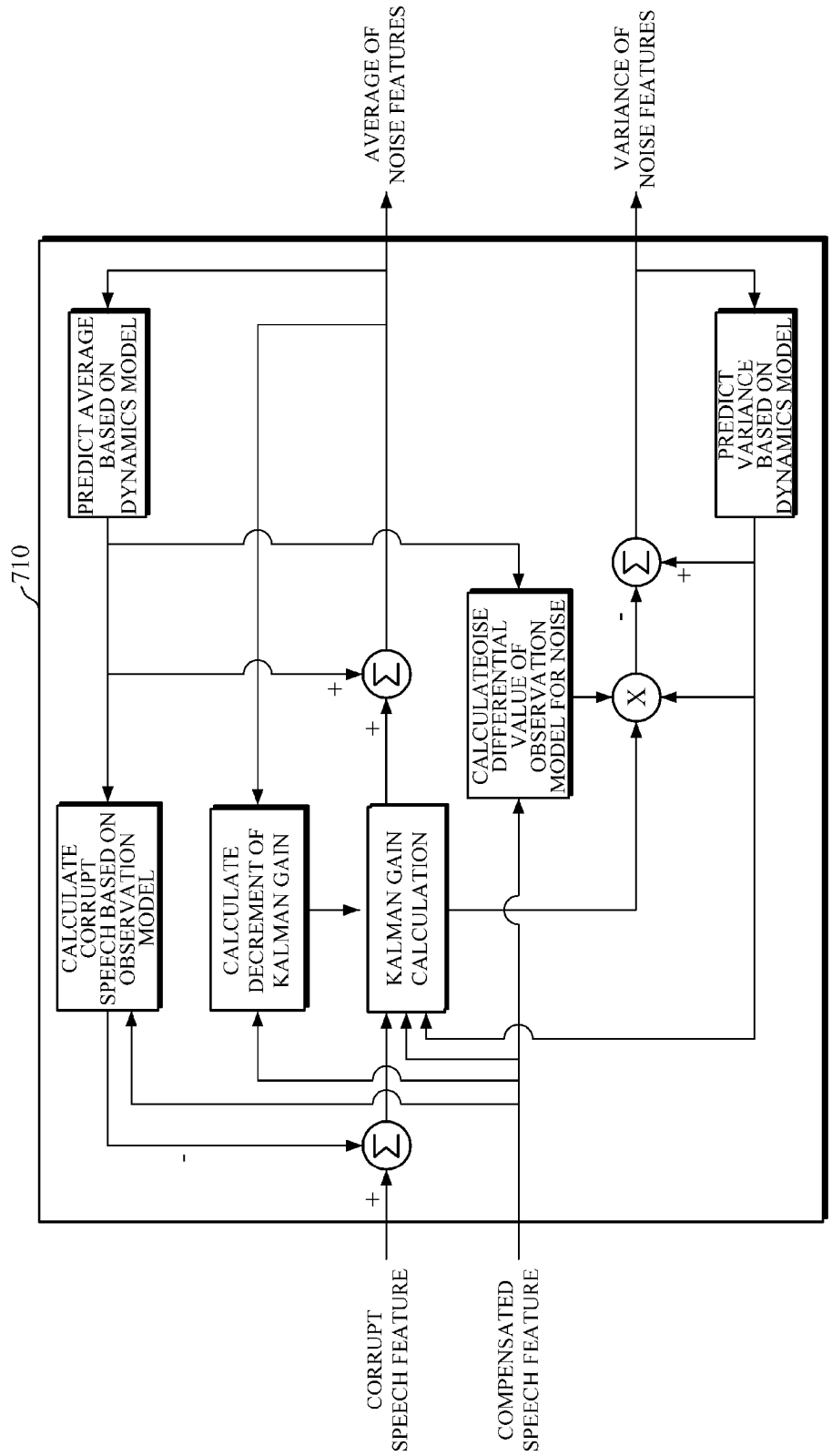
FIG. 7 is a diagram illustrating another example of a noise estimator of a feature compensation apparatus for speech recognition in a noisy environment according to another exemplary embodiment.

FIG. 7 is a diagram illustrating another example of a noise estimator of a feature compensation apparatus for speech recognition in a noisy environment according to another exemplary embodiment.

Referring to FIG. 7, a noise estimator 710 may estimate noise features in real-time by performing a Kalman gain control process to increase performance of an extended Kalman filter. Unlike in a non-speech interval, incorrect noise feature estimation in a speech interval may degrade speech recognition performance. In particular, during a speech interval, noise may be overly estimated and thus misconstrued as real speech and thus render a speech feature far from its desired state. Thus, according to the present exemplary embodiment, the Kalman gain may be tuned according to a ratio of speech feature to noise feature in a current frame. As shown in Equation 11, the greater volume of the speech, the more the Kalman gain is reduced, so that more weight can be given to an estimated noise in a previous frame that is more accurate than the current frame. In detail, a noise estimator 710 calculates an average and variance of noise features using Equation 2, for which the noise estimator 710 updates an average and variance of noise features in the current frame by reflecting the Kalman gain to the average and variance of predicted noise features. In this process, the noise estimator 710 reduces the Kalman gain of the average and variance of noise features which are to be updated in inverse proportion to a ratio of extracted corrupt speech feature to noise feature.

$$K_{new,k}(t) = K_k(t) \times \left( \gamma + (1 - \gamma) \times \frac{N_k(t)}{\hat{X}_k(t)} \right) \quad (11)$$

In Equation 11, $K_k(t)$ denotes a Kalman gain, $\hat{X}_k(t)$ denotes a compensated speech feature, $N_k(t)$ denotes the k-th noise feature of the t-th frame, and γ denotes a constant that indicates how much the Kalman gain is tuned, and ranges between 0 and 1.

Figure 8:
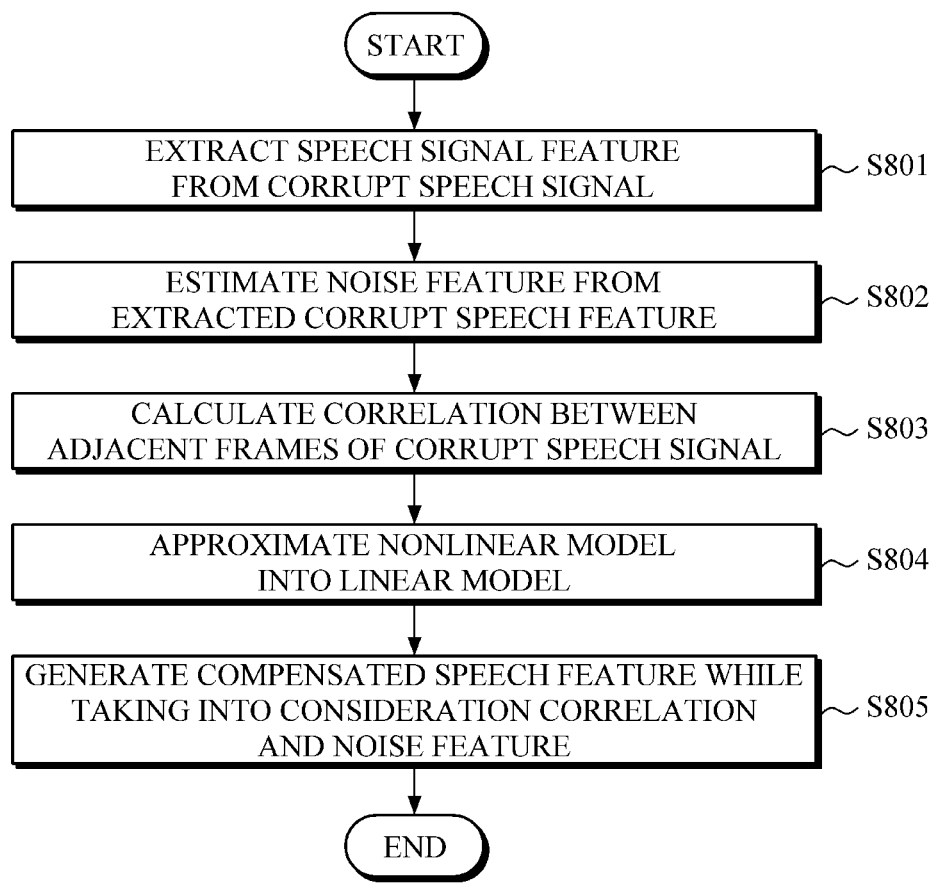
FIG. 8 is a flowchart illustrating a feature compensation method for speech recognition in a noisy environment according to an exemplary embodiment.

FIG. 8 is a flowchart illustrating a feature compensation method for speech recognition in a noisy environment according to an exemplary embodiment.

Referring to FIG. 8, in a feature compensation method, corrupt speech features are extracted from a corrupt speech signal, as depicted in S801. The corrupt speech signal refers to a speech signal with additive noise, as well as a target speech signal to be recognized. A feature compensation apparatus for speech recognition converts the corrupt speech signal from time domain into frequency domain, where the corrupt speech signal is divided into two or more frames at a designated time interval. Then, the feature compensation apparatus calculates log energy after applying Mel-scale filter bank, which is closely related to speech recognition, to the converted corrupt speech signal, and then obtains corrupt speech features.

Thereafter, the feature compensation apparatus estimates noise features using the extracted corrupt speech features and the compensated speech features, as depicted in S802. The feature compensation apparatus for speech recognition calculates an average and variance of noise features by applying an extended Kalman filter to the extracted corrupt speech features based on a dynamics model and an observation model. This process mainly consists of prediction and correction. The noise feature estimation process refers to FIG. 2.

After the noise features are estimated, a correlation between adjacent frames of the corrupt signal is calculated, as depicted in S803. To this end, the feature compensation apparatus calculates a state probability, by applying in advance, a Gaussian model or a HMM to training speech signals. Then, the apparatus may calculate the correlation between adjacent frames of the corrupt signal using the state probability. The correlation calculation process refers to FIGS. 4 and 5.

Then, information in the form of a nonlinear model is approximated into a linear model, as depicted in S804. The feature compensation apparatus approximates the training speech features, noise features, and nonlinearity of corrupt speech features into a linear model, using a Gaussian mixture model probability distribution and estimated noise features of calculated training speech features. The feature compensation apparatus approximates said information in the form of a nonlinear model into a linear model using a vector Taylor series or statistical linear approximation.

Then, in S805, the feature compensation apparatus generates compensated speech features by taking into consideration the correlation and the noise features. The feature compensation apparatus eliminates noise features of the extracted corrupt speech features to generate the compensated speech features by taking into consideration the calculated correlation between adjacent frames of the corrupt speech signal and the estimated noise features. As such, the feature compensation apparatus eliminates noise through the speech feature compensation described above, thereby improving the speech recognition performance.

According to the above exemplary embodiments, the feature compensation apparatus and method use a GMM component transition probability or an HMM state sequence probability in order to utilize temporal dynamics (correlation) of adjacent speech frames, which is one of the most important features that distinguish clear speech from noise. Said apparatus and method can improve the speech recognition in a noisy environment, by using the temporal dynamics (correlation) of adjacent speech frames. Especially, said apparatus and method can increase the speech recognition more effectively in an environment where there is background noise, such as babble noise or TV noise.

Also, the feature compensation apparatus and method smooth a speech signal when estimating noise using an extended Kalman filter, so that an accuracy of an observation model is increased, thereby improving the accuracy in the noise estimation. Furthermore, said apparatus and method tune the Kalman gain according to a ratio of the speech feature to noise feature in a current frame, thereby preventing speech recognition performance from degradation due to incorrect noise feature estimation in a speech interval.

The current embodiments can be implemented as computer readable codes in a computer readable record medium. Codes and code segments constituting the computer program can be easily inferred by a skilled computer programmer in the art. The computer readable record medium includes all types of record media in which computer readable data are stored. Examples of the computer readable record medium include a ROM, a RAM, a CD-ROM, a magnetic tape, a floppy disk, and an optical data storage. Further, the record medium may be implemented in the form of a carrier wave such as Internet transmission. In addition, the computer readable record medium may be distributed to computer systems over a network, in which computer readable codes may be stored and executed in a distributed manner.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A feature compensation apparatus for speech recognition in a noisy environment, the feature compensation apparatus comprising a computer readable medium storing computer readable code that implements:
   a feature extractor configured to extract corrupt speech features from a corrupt speech signal with additive noise that consists of two or more frames;
   a noise estimator configured to estimate noise features based on the extracted corrupt speech features and compensated speech features;
   a linear model generator configured to approximate a Gaussian mixture model (GMM) probability distribution, the estimated noise features and the extracted corrupt speech features into a linear model;
   a probability calculator configured to calculate a correlation between adjacent frames of the corrupt speech signal; and
   a speech feature compensator configured to generate the compensated speech features by eliminating noise features of the extracted corrupt speech features while taking into consideration the correlation between adjacent frames of the corrupt speech signal and the estimated noise features, and to transmit the generated compensated speech features to the noise estimator,
   wherein the noise estimator estimates an average and variance of the noise features based on a dynamics model of noise features of the extracted corrupt speech features and a nonlinear observation model of corrupt speech features, and
   wherein the noise estimator reduces a Kalman gain of the average and variance of noise features that are to be updated in inverse proportion to a ratio of the extracted corrupt speech feature to the noise feature.

2. The feature compensation apparatus of claim 1, wherein the probability calculator comprises
   a probability distribution obtainer configured to obtain a GMM probability distribution of training speech features from training speech signals that consist of two or more frames,
   a transition probability codebook obtainer configured to obtain a transition probability of a GMM mixture component between adjacent frames of the training speech features, and
   a transition probability calculator configured to search transition probabilities of a GMM mixture component between adjacent frames of each of the training speech signals to calculate a transition probability of the GMM mixture component that corresponds to a transition probability of a mixture component between adjacent frames of the corrupt speech features extracted from the corrupt speech signal.

3. The feature compensation apparatus of claim 2, wherein the speech feature compensator eliminates the noise features of the extracted corrupt speech features using the correlation between adjacent frames of the corrupt speech signal and the estimated noise features, wherein the correlation is based on the GMM probability distribution of the training speech features and the transition probability of a GMM mixture component.

4. The feature compensation apparatus of claim 1, wherein the feature extractor converts each frame of the corrupt speech signal from time domain to frequency domain, and calculates a log energy value by taking a logarithm of energy which has been calculated by applying a Mel-scale filter bank to the converted corrupt speech signal, thereby extracting the corrupt speech features.

5. The feature compensation apparatus of claim 4, wherein the feature extractor smooths the corrupt speech signal before taking a logarithm of the energy which has been calculated by applying the Mel-scale filter bank to the converted corrupt speech signal.

6. The feature compensation apparatus of claim 1, wherein the probability calculator obtains a statistic model with a hidden Markov model (HMM) structure of training speech features from training speech signals that consist of two or more frames, decodes the training speech features into a HMM, and calculates HMM state probabilities.

7. The feature compensation apparatus of claim 6, wherein the speech feature compensator eliminates the estimated noise features of the corrupt speech features using a statistical model of the training speech features, the estimated noise features, the extracted corrupt speech features, and the HMM state probabilities.

8. A feature compensation method for speech recognition in a noisy environment, the feature compensation method comprising:
   extracting speech feature from a corrupt speech signal with additive noise that consists of two or more frames;
   estimating noise features based on the extracted corrupt speech features and compensated speech features;
   approximating a GMM probability distribution, the estimated noise features and the extracted corrupt speech features into a linear model;
   calculating a correlation between adjacent frames of the corrupt speech signal; and
   generating compensated speech features by eliminating noise features of the extracted corrupt speech features while taking into consideration the correlation between adjacent frames of the corrupt speech signal and the estimated noise features, and transmitting the generated compensated speech features,
   wherein the estimation of the noise features comprises estimating an average and variance of noise features based on a dynamics model of noise features of the extracted corrupt speech features and a nonlinear observation model of corrupt speech features, and reducing a Kalman gain of the average and variance of noise features that are to be updated in inverse proportion to a ratio of the extracted corrupt speech feature to the noise feature.

9. The feature compensation method of claim 8, wherein the calculation of the correlation comprises:
   obtaining a Gaussian mixture model (GMM) probability distribution of training speech features from training speech signals that consist of two or more frames,
   obtaining a transition probability of a GMM mixture component between adjacent frames of the training speech features, and
   searching\transition probabilities of a GMM mixture component between adjacent frames of each of the training speech signals to calculate a transition probability of the GMM mixture component that corresponds to a transition probability of a mixture component between adjacent frames of the corrupt speech features extracted from the corrupt speech signal.

10. The feature compensation method of claim 9, wherein the generation of the compensated speech features comprises eliminating the noise features of the extracted corrupt speech features using the correlation between adjacent frames of the corrupt speech signal and the estimated noise features, wherein the correlation is based on the GMM probability distribution of the training speech features and the transition probability of a GMM mixture component.

11. The feature compensation method of claim 8, wherein the extraction of the corrupt speech features comprises converting each frame of the corrupt speech signal from time domain to frequency domain, and calculating a log energy value by taking a logarithm of energy which has been calculated by applying a Mel-scale filter bank to the converted corrupt speech signal, thereby extracting the corrupt speech features.

12. The feature compensation method of claim 11, wherein the extraction of the corrupt speech features comprises smoothing the corrupt speech signal before taking a logarithm of the energy which has been calculated by applying the Mel-scale filter bank to the converted corrupt speech signal.

13. The feature compensation method of claim 8, wherein the calculation of the correlation comprises obtaining a statistic model with a hidden Markov model (HMM) structure of training speech features from training speech signals that consist of two or more frames, decoding the training speech features into a HMM, and calculating HMM state probabilities.

14. The feature compensation method of claim 13, wherein the generation of the compensated speech features comprises eliminating the estimated noise features of the corrupt speech features using a statistical model of the training speech features, the estimated noise features, the extracted corrupt speech features, and the HMM state probabilities.

* * * * *